United States Patent [19]

Muccione

[11] Patent Number: 4,665,571

[45] Date of Patent: May 19, 1987

[54] URINAL

[76] Inventor: Vincent J. Muccione, 8 Maple Ave., East Hanover, N.J. 07936

[21] Appl. No.: 654,137

[22] Filed: Sep. 26, 1984

[51] Int. Cl.⁴ ........................ A47K 11/00; B60R 15/00

[52] U.S. Cl. ........................ 4/144.1; 4/144.3; 4/114.1; 4/144.4

[58] Field of Search ........................ 4/144.1-144.4, 4/301, 114.1

[56] References Cited

U.S. PATENT DOCUMENTS

| | | | |
|---|---|---|---|
| Re. 28,278 | 12/1974 | Borse | 4/144.2 |
| 805,312 | 1/1905 | Meinecke | 4/144.1 |
| 2,542,276 | 2/1951 | Felts | 4/144.3 |
| 2,582,398 | 1/1952 | Siegenthal | 4/144.1 |
| 2,731,648 | 1/1956 | Clement | 4/144.1 |
| 3,479,671 | 11/1969 | Beich | 4/144.1 |
| 3,716,871 | 2/1973 | Borse | 4/144.2 |
| 3,727,244 | 4/1973 | Collins | 4/144.3 |
| 3,927,426 | 12/1975 | Geddes | 4/144.3 |
| 4,059,124 | 11/1977 | Hill | 4/144.2 |
| 4,270,231 | 6/1981 | Zint | 4/144.1 |
| 4,422,188 | 12/1983 | Strutton et al. | 4/144.4 |

FOREIGN PATENT DOCUMENTS

| | | | |
|---|---|---|---|
| 1131597 | 2/1957 | France | 4/144.4 |
| 16035 | of 1909 | United Kingdom | 4/144.4 |

*Primary Examiner*—Henry K. Artis
*Attorney, Agent, or Firm*—Haidri, Glazer & Kamel

[57] ABSTRACT

A molded container functioning as a urinal has a hollow body, neck and mouth. This neck extends outwardly at an obtuse angle with respect to the length of the bodyand terminates at the mouth. This mouth has a lip marking an oval opening to the neck. The height of this oval opening of the mouth is a linear dimension substantially coplanar with the longitudinal axes of the body and the neck. The height of the oval opening exceeds its width. This mouth, when viewed parallel to the width and height of said mouth, has a concave and convex outline, respectively. The lip can be shaped as an inwardly folded flange. The hollow body has a service side on which the container can lie with its neck directed upwardly. When placed on its service side, the container has the lowest portion of its mouth at about the same elevation as the side of the body opposite the service side. The body also has a tail end opposite the junction of the body and neck. The container is uprightly standable on the tail end. The tial end of the body makes an obtuse angle with respect to its service side. Thus, any disturbance of the center of gravity caused by the canting of the neck is mitigated when the container stands on its tail end.

6 Claims, 7 Drawing Figures

URINAL

BACKGROUND OF THE INVENTION

The present invention relates to urinals and, in particular, to urinals arranged to conform to the female anatomy and usable by males as well.

Significant disadvantages surround commonly used urinals. Female patients must often lift themselves or must be placed into awkward positions to allow full capture of urine. Known urinals have attempted to overcome these disadvantages by employing a container having a canted neck terminating in a curved mouth designed to encircle the mons when the patient is lying supine. See for example, U.S. Pat. No. 3,927,426. A disadvantage with this known type of urinal is that the molding of the container mouth includes sharp corners, likely to cause discomfort and inadequate for capturing urine without dripping.

Also, a disadvantage of known urinals is the fact that the urinal, when in service, has the lowest point of its mouth at such an elevation that the container cannot be fully filled. Another disadvantage of these known urinals is the fact that the center of gravity is somewhat offset by the canting of the neck and the offset of the handle, both of which tend to unbalance the container when placed on its tail end. Thus, the container is easily knocked over.

Accordingly, there is a need for an improved urinal that is readily used by a supine patient of either sex; fillable to almost its full capacity; and which can be stably placed on its tail end without serious danger of upset.

SUMMARY OF THE INVENTION

In accordance with the illustrative embodiments demonstrating features and advantages of the present invention, there is provided a urinal comprising a molded container having a hollow body, a neck and a mouth. This neck extends outwardly at an obtuse angle with respect to the length of the body and terminating with the mouth. This mouth has a lip marking an oval opening to the neck. The height of this oval opening to the mouth is a linear dimension substantially coplanar with a longitudinal axis of the body and the neck. This height of the oval opening exceeds its width. The mouth, when viewed parallel to the width and height of the mouth, has a concave and convex outline, respectively. Furthermore, in a highly prefered embodiment, the lip is shaped as an inwardly folded flange.

Also in accordance with a highly preferred embodiment, the body has a service side on which the container can lie with its neck directed upwardly. The container, when placed with its service side down and level, has the lowest portion of its mouth at about the same elevation as the side of the body opposite the service side.

Also in accordance with a highly preferred embodiment, the body has a tail end opposite the junction of the body and neck. The container is uprightly standable on the tail end. This tail end of the body makes an obtuse angle with respect to its service side. Thus, the disturbance of the center of gravity caused by the canting of the neck is mitigated when the container stands on its tail end.

Containers built in accordance with the foregoing principles have, therefore, significant advantages. The container can be filled fully if the mouth is positioned as described above for the preferred embodiments. Additionally, the obtuse angle between the tail end and service side allows the container to rest more stably with its center of gravity more properly positioned. Additionally, the inclusion of an inwardly directed flange on the lip avoids sharp and uncomfortable corners. Additionally, the usage of the flange allows definite capture of urine without dripping. It is also apparent that the same urinal can be used by male and female patients.

Moreover, graduated markings can be placed on the service side of the container to allow simple measurement of the volume of liquid in the container. With the addition of a handle on the side opposite the service side, a very easily used urinal is achieved.

BRIEF DESCRIPTION OF THE DRAWING

The above brief description as well as other features and advantages of the present invention will be more fully appreciated by reference to the following detailed description of a presently preferred but nonetheless illustrative embodiment in accordance with the present invention when taken in conjunction with the accompanying drawings, wherein.

DETAILED DESCRIPTION OF THE PREFERRED EMBODIMENTS

Figure 1:
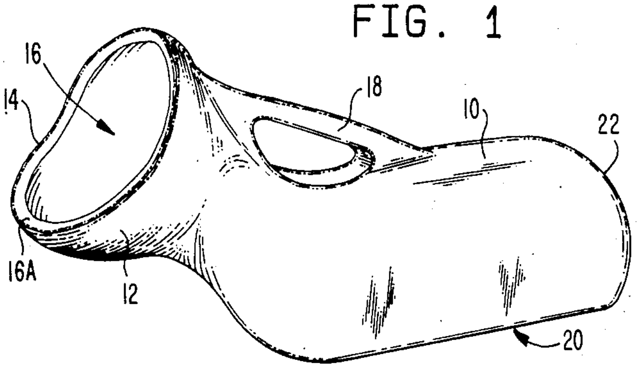
FIG. 1 is a perspective view of a urinal lying on its service side, according to the principles of the present invention.
Figure 2:
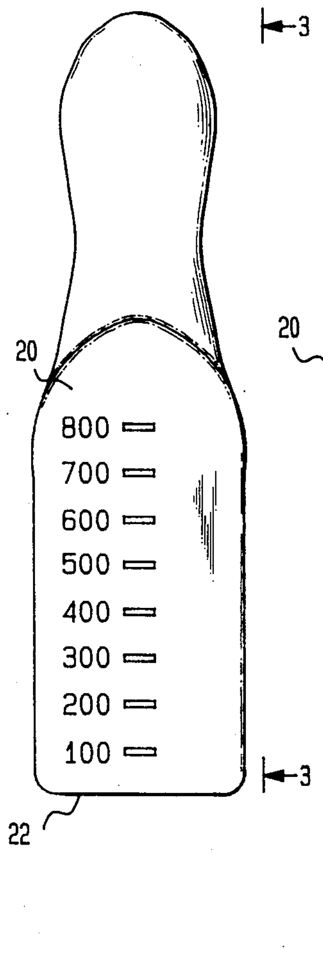
FIG. 2 is a view of the service side of the urinal of FIG. 1 standing on its tail end.
Figure 3:
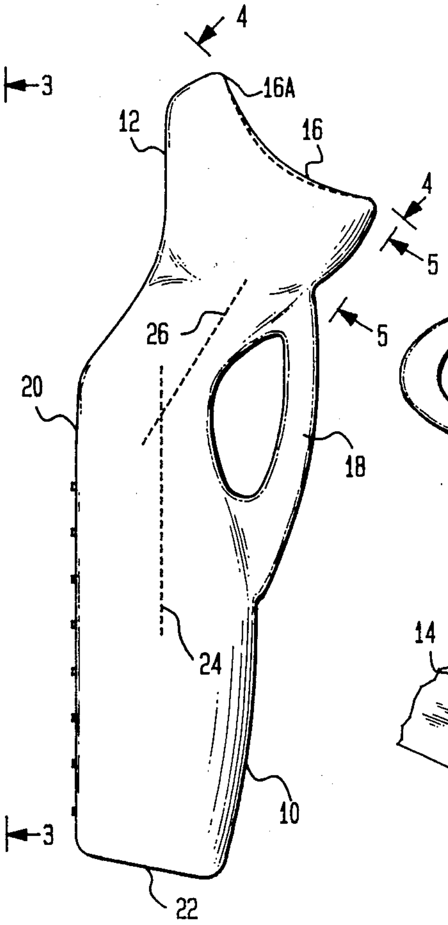
FIG. 3 is a another side view along lines 3—3 of FIG. 2.

Referring to FIGS. 1, 2, and 3 a urinal is shown as a container having hollow body 10, a neck 12, and a mouth comprising a lip 14 encircling an oval opening 16. Preferably, the illustrated container is formed of a plastic such as polyethylene or polypropylene that can be sufficiently sturdy to withstand autoclaving without warping. In this embodiment, the overall length of the container is 12¾ inches although the length can vary depending upon the desired capacity. The gauge of the walls of the container is preferably 0.040 inch. Preferably the container will be manufactured by a known blown molding technique and certain reverse curves can be fabricated by reverse tooling pieces. In this embodiment, handle 18 is a hollow passage communicating between the body 10 and the junction of neck 12 and body 10. In some embodiments, the handle 18 can be a cantilever joined at only its forward portion (that is, closer to the mouth). In this view the container is shown resting on a service side 20 which is preferably flat. In this preferred embodiment the service side is provided with graduated markings to indicate the volume contained by the container. To facilitate the use of such graduated markings, the walls of the container can be formed of a translucent material so that the silhouette of the contents is readily visible.

Also, for standing the container upright, a preferably flat tail end 22 is provided. In this embodiment, tail end 22 is at an obtuse angle of 96 degrees with respect to service side 20. As shown in FIG. 3, this places the longitudinal axis 24 of body 10 six degrees to the left, when standing. This partially offsets the counterbalancing effects of the neck 12 and handle 18 tending to offset the container to the right. Longitudinal axis 24 is a line centrally within the body 10 within a plane of symmetry if such exists, and running through the center of gravity of the container 10 and directed toward the center of the "footprint" of tail end 22. Similarly, the longitudinal axis 26 of neck 12 can be considered the line through the center of gravity of neck 12 directed toward the center of the opening of mouth 16. It will be noted that longitudinal axes 24 and 26 form an obtuse angle. Furthermore, the container when placed on its service side 20 has the lowest point 16A of the mouth 16 at an elevation approximately the same as the side of body 10 opposite service side 20.

The width of body 10 as viewed in FIG. 2 is about 3½ inches. The width of body 10 as viewed in FIG. 3, while varying somewhat, is approximately 3 inches. The volume of body 10, as indicated by the upper graduations of FIG. 2, is 800 milliliters. The junction between neck 12 and body 10 is defined by a transverse plane (transverse to the plane of symmetry if appropriate) bisecting the angle formed by the axes of neck 12 and body 20.

Figure 5:
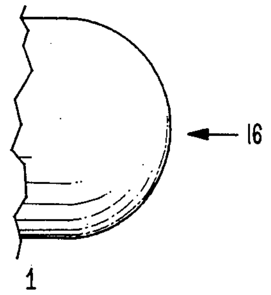
FIG. 5 is a detailed lateral view of the mouth taken along lines 5—5 of FIG. 3.
Figure 4:
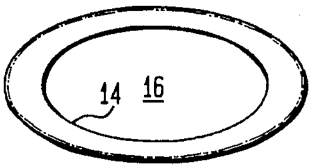
FIG. 4 is a detailed view of the mouth taken along lines 4—4 of FIG. 3.

Referring to FIG. 4, a view is given directly into the oval opening of mouth 16. The overall height of mouth 16 is preferably 4.5 inches while the transverse width dimension is preferably 2 3/16 inch. The effective size of the oval opening 16 is somewhat smaller due to the inwardly projecting flange of lip 14. Referring to FIGS. 3 and 5, it will be appreciated that the mouth 16 has a concave outline when viewed parallel to its width as in FIG. 3, and convex when viewed parallel to its height as in FIG. 5. The mouth 16 essentially traces a closed loop on the surface of an imaginary cylinder having an axis parallel to the width of mouth 16. This imaginary cylinder has a radius of 4 1/16 inch, preferrably.

Figure 7:
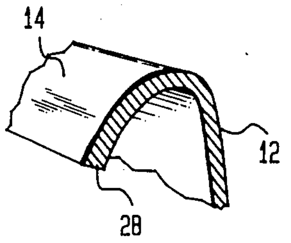
FIG. 7 is a detailed perspective view of the flange of the mouth of FIG. 1.

Referring to FIG. 7, the previously mentioned flange of lip 14 is shown forming an angle of approximately 27 degrees with respect to the wall of neck 12. This relatively sharp angle insures that beveled edge 28 away from the skin of the patient.

In the preferred embodiment, the container is formed by blow molding wherein immediately after the molding step, the oval opening of mouth 16 is closed, except for possibly a venting tube. Accordingly, the piece, after being removed from the mold, will have the original wall cut away to form the oval opening cut, as illustrated with a bevel. The remaining wall material will form a lip flange 14 that is approximately ¼ inch wide.

Figure 6:
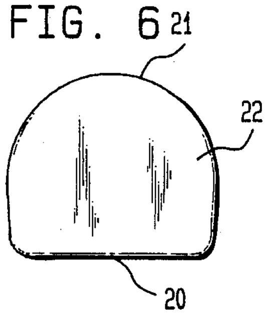
FIG. 6 is a view of the tail end of the urinal of FIG. 1.

Referring to FIG. 6, it shows an end view of tail end 22 showing a flat service side 20 and a rounded opposite side 21.

When used by patients the urinal is placed between the thighs, with the service side 20 down and the rounded side 21 providing a comfortable surface to be placed between the thighs. It will be appreciated that the previously described curves of mouth 16 provide a tight fitting on the female mons, which prevents spillage or dripping. Of course the container as shown can be used by male patient. After use, the amount of urine excreted can be quickly measured by standing the container upright on tail end 22. The volume then is easily read by noting the graduations on the service side 20.

It is to be appreciated that various modifications may be implemented with respect to the above described preferred embodiment. For example, while a body having three generally flat sides and a rounded fourth side is illustrated, other cross sections are possible including triangular or other arrangements in which only one side is flat. Additionally, the angle formed between the neck and body can be adjusted depending upon the size and proportions of the container. Additionally, while the lower portion of the mouth is shown at about the same elevation as the side of the body opposite the service side, in some embodiments the elevational alignment can be varied somewhat without departing from the scope of the present invention. Also while a container fabricated of plastic is illustrated, in some embodiments a metal or other material may be used. Similarly, the various proportions, dimensions, thicknesses and sizes of the container can be varied depending upon the desired capacity, clearance, ease of use etc. Additionally, the container can be fabricated from other molding techniques including: injection molding; fabricating from sheet metal developments etc.

Obviously, many modifications and variations of the present invention are possible in light of the above teachings. It is, therefore, to be understood that within the scope of the appended claims, the invention may be practiced otherwise than as specifically described.

What is claimed is:

1. A urinal comprising: a molded container having a hollow body, a neck and a mouth, said neck extending outwardly at an obtuse angle with respect to the length of said body and terminating with said mouth at one end and terminating at its other end into a flat service side within said body at the bottom portion of its said other end, said mouth having a lip marking an oval opening to said neck which defines an obtuse plane such that when said mouth is located in a flush relation to the vulvovaginal area of a human female lying in a supine position that a vertical line drawn through the urethra of said female lies within close proximity of a like vertical line drawn through the centroid of said obtuse plane, the height of said oval opening of said mouth being a linear dimension substantially coplanar with longitudinal axes of said body and said neck, said height of said oval opening exceeding its width, said mouth when viewed parallel to the width and height of said mouth having a concave and a convex outline, respectively, said mouth having a curvilinear perimeter approximately the like perimeter of the human female mons thereby ensuring leak proof contact when said urinal is in actual use said lip being shaped as an inwardly folded flange wherein said container when placed with its service side downward and level has the lowest portion of said mouth at about the same elevation as the side of said body opposite said service side.

2. A urinal according to claim 1 wherein said body has a tail end opposite the junction of said body and neck, said container being uprightly standable on said tail end, said body having a service side on which said container can lie with its neck directed upwardly.

3. A urinal according to claim 2 wherein said inwardly folded flange terminates with an inside bevel.

4. A urinal according to claim 3 wherein said container has a handle integrally molded on the side opposite said service side.

5. A urinal according to claim 4 wherein said service side of said body has graduated markings for indicating the volume of the contents of said container.

6. A urinal according to claim 5 wherein said tail end of said body makes an obtuse angle with respect to its service side, whereby the disturbance of the center of gravity caused by the canting of said neck is mitigated when the container stands on said tail end.

* * * * *